(12) United States Patent
Yang et al.

(10) Patent No.: US 8,525,897 B2
(45) Date of Patent: Sep. 3, 2013

(54) DEVICE AND METHOD FOR PREDICTING PHOTOGRAPHING TIMING

(75) Inventors: Tai-Chang Yang, Kaohsiung (TW); Wen-Yan Chang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 84 days.

(21) Appl. No.: 13/237,410

(22) Filed: Sep. 20, 2011

(65) Prior Publication Data

US 2012/0320234 A1 Dec. 20, 2012

(30) Foreign Application Priority Data

Jun. 14, 2011 (TW) .............................. 100120786 A

(51) Int. Cl.
 *H04N 5/228* (2006.01)
 *H04N 5/235* (2006.01)

(52) U.S. Cl.
 USPC .................................. 348/222.1; 348/229.1

(58) Field of Classification Search
 USPC ............ 382/116–118; 348/222.1, 234, 229.1
 See application file for complete search history.

(56) References Cited

U.S. PATENT DOCUMENTS

| | | | |
|---|---|---|---|
| 7,991,200 B2 * | 8/2011 | Ito .................................. | 382/115 |
| 8,340,369 B2 * | 12/2012 | Kawada ......................... | 382/118 |
| 2009/0304289 A1 * | 12/2009 | Karimoto et al. .............. | 382/224 |
| 2010/0073497 A1 * | 3/2010 | Katsumata et al. ....... | 348/211.99 |
| 2011/0129127 A1 * | 6/2011 | Yang et al. ..................... | 382/118 |
| 2011/0216222 A1 * | 9/2011 | Niyagawa et al. ........ | 348/231.99 |

\* cited by examiner

*Primary Examiner* — Tuan Ho
*Assistant Examiner* — Chan Nguyen
(74) *Attorney, Agent, or Firm* — Wang Law Firm, Inc.; Li K. Wang; Stephen Hsu

(57) ABSTRACT

A device and a method for predicting photograph timing. First, a detection step is performed. Then, a face determination step is performed to determine whether or not a face is shown. A face-classifying step is then performed. If a detected image is a non-front face, a difference generation step is then performed. A difference determination step is performed when a plurality of differences are obtained to determine whether or not the sequentially adjoined differences are reduced, wherein if the sequentially adjoined differences are reduced, a photographing timing is predicted according to a reduction degree of the differences. As a result, the probability of successfully photographing the front face can be enhanced. In addition, a training database that has both front face information and non-front face information can be utilized. As a result, it is not easy to determine the non-front face as the front face incorrectly.

10 Claims, 3 Drawing Sheets

DEVICE AND METHOD FOR PREDICTING PHOTOGRAPHING TIMING

CROSS-REFERENCE TO RELATED APPLICATION

This application claims the benefit of Taiwan Patent Application No. 100120786, filed on Jun. 14, 2011, in the Taiwan Intellectual Property Office the disclosure of which is incorporated herein by reference.

BACKGROUND OF THE INVENTION

1. Field of the Invention

The present invention relates to a device and a method for predicting photographing timing, and more particularly to the device and the method for predicting a better photographing timing in which a non-front face turns into a front face so as to enhance the possibility of successfully photographing the front face.

2. Description of the Related Art

In a conventional manner of predicts photographing timing of faces, it is usually determined whether or not a front face is shown up so as to further decide a shutter taking pictures. More specifically, the system uses some face detection method of non-beforehand training or beforehand training to determine whether or not a human face is shown up. When determining that the face shows up, the system then determines whether or not the face is the front face by using the manners of non-beforehand training or beforehand training When determining that the front face shows up, the system further notifies the shutter to take pictures. The manner of non-beforehand training includes an edge analysis, a color analysis and a feature analysis. The manner of beforehand training includes a neural network or a template comparison.

However, if the system determines that the front face does not show up but face naturally turns into the front face after such determination, the front face can not be accurately taken. Consequently, based on only the determination whether the front face shows up or not, the possibility of successfully taking a picture of the front face is reduced.

In addition, if the method of beforehand training, such as a front face template database, is used to determine whether or not the detected face is the front face, the system frequently error-judges the non-front face as the front face. As a result, when the shutter is notified to take a picture, the front face is unable to be accurately photographed. Consequently, the foregoing problems need to be overcome.

SUMMARY OF THE INVENTION

In view of the shortcomings of the prior art, the inventor(s) of the present invention based on years of experience in the related industry to conduct extensive researches and experiments, and finally developed a method for predicting photographing timing as a principle objective to overcome the foregoing shortcomings.

To achieve the foregoing objective, a method and a device for predicting photographing timing that predicts a timing of turning a non-front face into a front face are provided.

To achieve another objective of the invention, a method and a device for predicting photographing timing that enhances the possibility of successfully photographing the front face are provided.

To achieve a further objective of the invention, a method and a device for predicting photographing timing to prevent from erroneously judging the non-front face as the front face are provided.

According to the foregoing objectives of the invention, the method comprises the following steps of: performing a detection step to start image detection for detecting a plurality of images; performing a face determination step to determine whether or not a face is shown on the detected images; performing a face classifying step to classify the face into a front face or a non-front face based on an face angle and a training database when it is determined that the face is shown; executing a notification step to notify a shutter to take pictures if the shown face is the front face; executing a difference generation step to calculate a difference between the face angle of the non-front face and an angle of the front face if the shown face is the non-front face; executing a difference determination step when a plurality of differences are obtained from the detected images to determine whether or not the sequentially adjoined differences are unchanged, increased or reduced; if the sequentially adjoined differences are unchanged or increased, the detection step, the face determination step and the face classifying step are performed repeatedly; if the sequentially adjoined differences are reduced, a photographing timing is predicted according to a reduction degree of the differences; performing a waiting step to wait for the photographing timing; and performing the notification step to notify the shutter to take pictures.

The method for predicting photographing timing according to the invention uses the training database to classify the shown face into a front face or a non-front face and calculates a difference between the angle of the non-front face and the angle of the front face. The difference is then transmitted to the calculation unit. The calculation unit is for calculating the sequentially adjoined differences to determine whether or not the sequentially adjoined differences are unchanged, increased or reduced. Accordingly, the invention can predict better photographing timing so as to notify the shutter to take pictures. As a result, the timing in which the non-front face turns into the front face is predicted so as to enhance the possibility of successfully photographing the front face. In addition, the invention further utilizes a training database having a front face template and a non-front face template. Therefore, it is prevented from erroneously judging the non-front face as the front face so as to enhance the possibility of successfully photographing the front face.

It should be noted that the invention uses a connection between eyes and a mouth of a face to obtain a plane by definition, and an angle between the normal line of the plane and a normal line of an observation plane is defined. When the angle is within a range of about 0 to 15 degrees, the face is defined as the front face; and when the angle exceeds in 15 degrees, the face is defined as the non-front face.

The method for predicting photographing timing according to the invention can be adopted by a camera. The camera includes a face determination unit, a calculation unit, a training database and a shutter, wherein the face determination unit determines whether or not a face is shown on a plurality of images, and the face determination unit performs a face determination step to determine whether or not a face is shown on a plurality of detected images based upon a method of non-beforehand training or a method of beforehand training The method of non-beforehand training is an edge analysis, a color analysis or a feature analysis. The method of beforehand training is a neural network or a template comparison. The training database is used for classifying the shown face into a front face or a non-front face based on an angle. The training database defines the angle according to a face feature, and the face feature is a facial attribute. When the angle is within a range of about 0 to 15 degrees, the shown face is defined as the front face; and when the angle exceeds in 15 degrees, the shown face is defined as the non-front face. The calculation unit calculates a plurality of sequentially adjoined differences of the sequentially adjoined non-front face. If the sequentially adjoined differences are reduced, the shutter is notified to take pictures.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
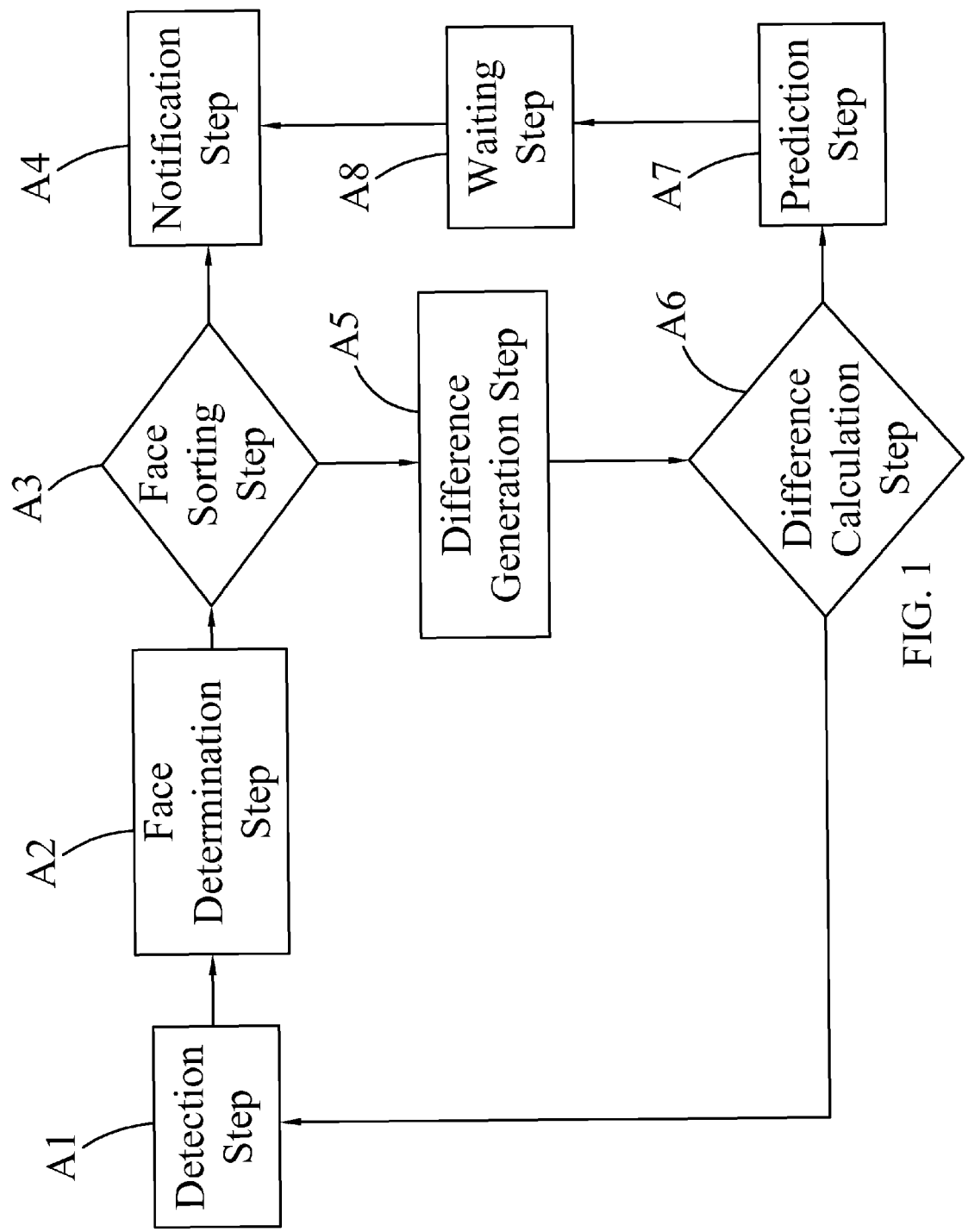
FIG. 1 is a flowchart showing a method for predicting photographing timing according to a preferred embodiment of the present invention.

With reference to FIG. 1, a flowchart showing a method for predicting photograph timing in accordance with a preferred embodiment of the invention is depicted. The method comprises the steps of, firstly, performing a detection step A1 to start image detection for detecting several images; and performing a face determination step A2 to determine the detected images obtained in the detection step A1, wherein the foregoing face determination step A2 is performed by a method of beforehand training or a method of non-beforehand training so as to determine whether or not a face appear on the detected images, wherein the method of non-beforehand training is, for example, edge analysis, color analysis, feature analysis, etc. The method of beforehand training is, for example, artificial neural network or template comparison and so on.

After the face determination step A2 is completed and it is also determined that the face is shown up, a face classifying step A3 is performed for classifying the shown face into front face or non-front face based on an face angle and a training database. More specifically, the foregoing training database is generated by defining the face angle by face feature such as facial attribute, wherein the face is defined to as a front face if the foregoing face angle is within a range of 0 to 15 degrees, and the face is defined to as a non-front face if the foregoing face angle exceeds 15 degrees. As a result, the training database can be generated according to a large amount of front face data and not-front face data by using an algorithm.

After completing the face classifying step A3, a notification step A4 is performed so as to notify a shutter to take a picture if the shown face is the front face. In addition, after the face classifying step A3 is completed, a difference generation step A5 is performed if the shown face is the non-front face so as to calculate difference between the face angle of the non-front face and the face angle of the front face. If there are differences in the detected images by foregoing calculation, a difference determination step A6 is performed to determine whether or not the sequentially adjoined differences are unchanged, increased or reduced. After completing the difference determination step A6, the detection step A1, the face determination step A2 and the face classifying step A3 are performed repeatedly if the differences that are sequentially adjoined are unchanged or increased. After completing the difference determination step A6, a prediction step A7 is performed to predict a better photographing timing based upon the reduction degree of the difference if the sequentially adjoined differences are reduced. After completing the prediction step A7, a waiting step A8 is performed to wait for the coming of the photographing timing. After completing the waiting step A8, a notification step A4 is performed to notify the shutter to performing a picture-taking step to take a picture.

Figure 2:
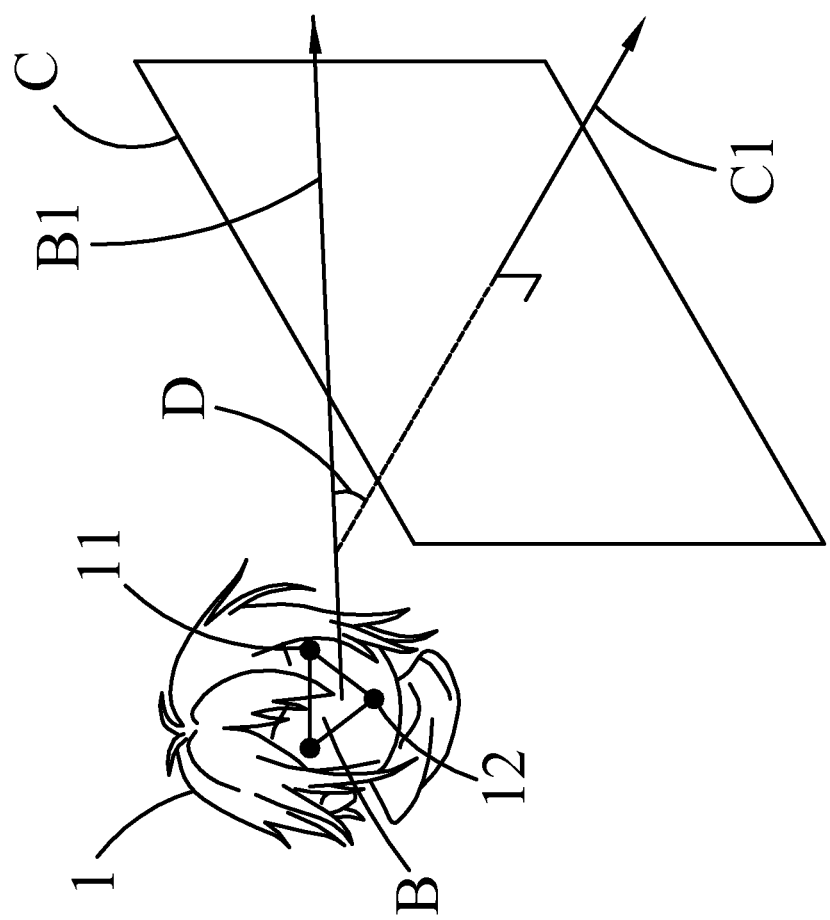
FIG. 2 is a schematic diagram showing an angle definition of a method for predicting photographing timing according to a preferred embodiment of the present invention.

With reference to FIG. 2, a schematic diagram showing an angle definition of a method for predicting photographing timing according to a preferred embodiment of the invention is depicted. As shown in FIG. 2, a connecting line between eyes 11 and a mouth 11 of a face 1 is defined as a plane B such that an angle between a normal line B1 of the plane B and a normal line C1 of an observation plane C is defined as an angle D. If the foregoing angle D is within a range of about 0 to 15 degrees, the face 1 is defined as a front face. If the foregoing angle exceeds 15 degrees, the face is defined as a non-front face. The forgoing example for defining the angle D is illustrated for exemplification, but not for limitation.

Figure 3:
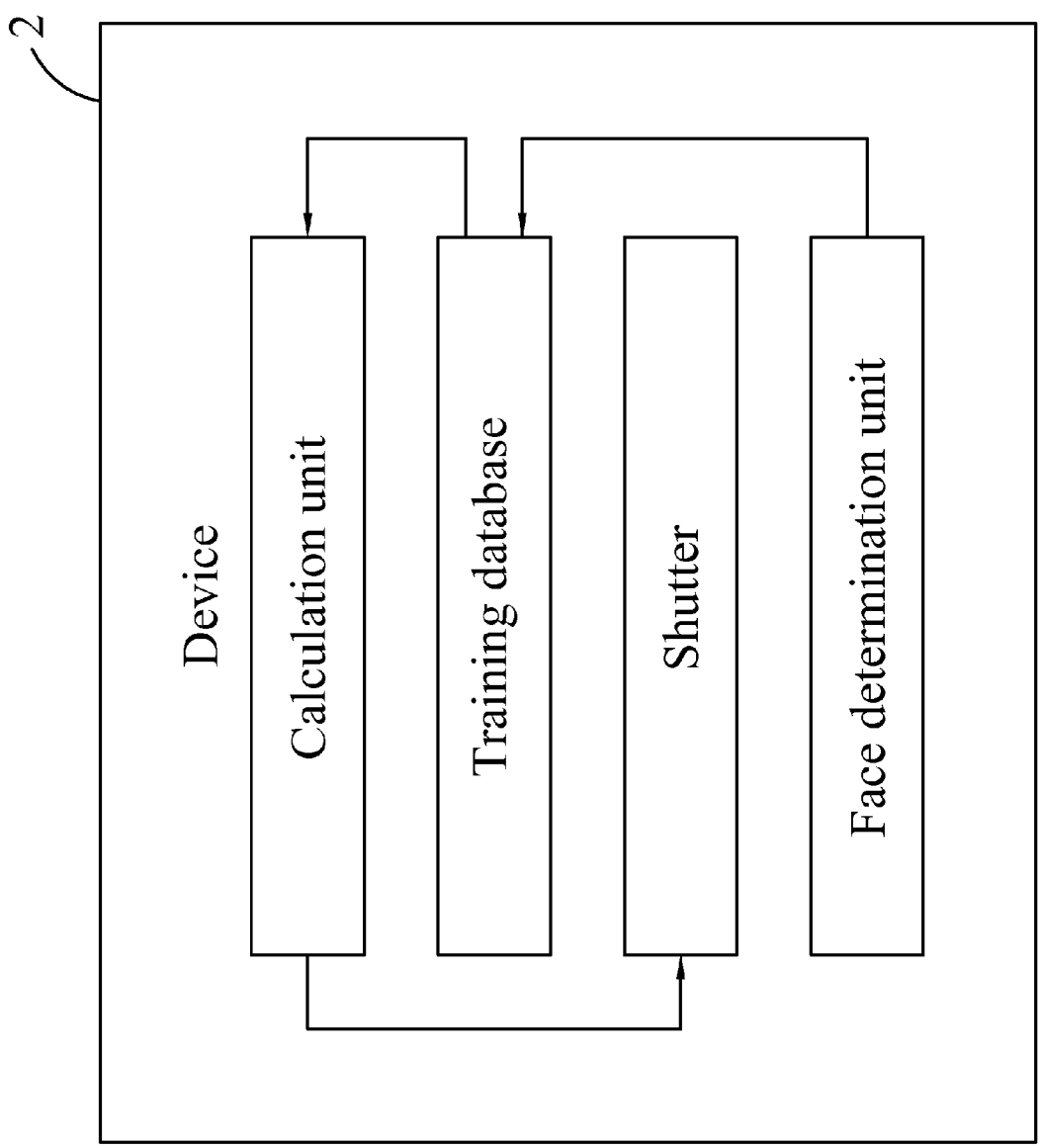
FIG. 3 a block diagram showing a device for predicting photographing timing according to the present invention.

With reference to FIG. 3, a block diagram showing a device for predicting photographing timing according to the invention is depicted. The method for predicting photographing timing of the invention can be adopted by a device 2 such as a camera. The camera at least comprises a face determination unit, a calculation unit, a training database and a shutter. The face determination unit is used for determining whether or not a face is shown on the plurality of images. The face determination is used for performing determination step by a method of beforehand training or a method of non-beforehand training. The method of non-beforehand training is for example edge analysis, color analysis or feature analysis. The foregoing method of beforehand training is, for example, neural network or template comparison. The training database is used for classifying a shown face into a non-front face or a front face based on an angle. The face feature is facial attribute. When the angle is within a range of about 0 to 15 degrees, the shown face is defined as a front face. When the angle exceeds 15 degrees, the shown face is defined as a non-front face. The calculation unit is used for calculating differences of the sequentially adjoined non-front faces. If the sequentially adjoined differences are reduced, the shutter is notified to perform a picture taking step for taking pictures. It should be noted that the above-mentioned faces are exemplified to be human faces without limitation, and faces of other species, such as dogs or sheep, can also be reasonably applied in the invention.

The method for predicting photographing timing of the invention has the following advantages:

1. The possibility of successfully photographing the front face is increased.

The method for predicting photographing timing of the invention uses the training database to classify the shown face into the front face or non-front face and calculates the difference between the angle of the non-front face and the angle of the front face and then transmits the difference to the calculation unit. The calculation unit calculates the sequentially adjoined differences for determining whether or not the sequentially adjoined differences are unchanged, increased or reduced. The better photographing timing is therefore predicted to notify the shutter to take pictures. Accordingly, the timing in which the non-front face turns into the front face is predicted to increase the possibility of successfully the front face.

2. The non-front face is not easily incorrectly determined as the front face:

The method for predicting photographing timing of the invention is based on the training database to classify the shown face into the front face or non-front face. The training database is generated by defining face angles based on the face features. If the foregoing face angle is within a range of about 0 to 15 degrees, the face is defined as the front face. If the foregoing face angle exceeds 15 degrees, the face is defined as the non-front face. A large amount of front face data and non-front face data are used for generating the training database by using algorithm. In another word, the invention utilizes the training database having the front face template and the non-front face template such that it is avoided to incorrectly judge the non-front face as the front face, thereby increasing the possibility of successfully photographing the front face.

While the invention has been described by device of specific embodiments, numerous modifications and variations could be made thereto by those generally skilled in the art without departing from the scope and spirit of the invention set forth in the claims.

What is claimed is:

1. A method for predicting photographing timing of a photographing device, the method comprising steps of:
   performing a detection step to detect a plurality of images;
   performing a face determination step to determine whether or not a face is shown on the detected images;
   classifying the shown face into a front face or a non-front face based on a face angle of the shown face and a training database;
   executing a notification step to notify a shutter to perform a picture taking step if the shown face is the front face;
   executing a difference generation step to calculate a difference between the face angle of the shown face and a face angle of the front face if the shown face is the non-front face;
   executing a difference determination step when a plurality of angle differences are obtained from the detected images so as to determine whether or not neighboring angle differences arranged in sequence are unchanged, increased or reduced, then the detection step, the face determination step and the face classifying step are repeated while a photographing timing is predicted according to a reduction degree of the angle differences if the neighboring angle differences arranged in sequence are reduced;
   performing a waiting step to wait for the photographing timing; and
   performing the notification step to notify the shutter to perform the picture taking step.

2. The method for predicting photographing timing of claim 1, wherein the face determination step is performed by a method of beforehand training or a method without beforehand training, and the method of non-beforehand training is edge analysis, color analysis or feature analysis.

3. The method for predicting photographing timing of claim 2, wherein method of beforehand training is neural network or template comparison.

4. The method for predicting photographing timing of claim 1, wherein the face angle is defined by using a face feature and the face feature is a facial attribute.

5. The method for predicting photographing timing of claim 4, wherein when the face angle is within a range of 0 to 15 degrees, the shown face is defined as the front face; and when the face angle exceeds 15 degrees, the shown face is defined as the non-front face.

6. A device using the method for predicting photographing timing of claim 1, comprising:
   a face determination unit, a calculation unit, a training database and a shutter, wherein the face determination unit performs a face determination step to determine whether or not a face is shown on a plurality of detected images, and the training database is used for classifying the shown face into a front face or a non-front face based on a face angle of the shown face, and the calculation unit is used for calculating a plurality of angle differences between the face angle of the shown face and a face angle of the front face if the show face is the non-front face, the calculating unit is further used for determining whether or not neighboring angle differences arranged in sequence are unchanged, increased or reduced such that the shutter is notified to take a picture if the neighboring angle differences are reduced.

7. A device of claim 6, wherein the face determination unit performs the face determination step by a method of beforehand training or a method of non-beforehand training, and the method of non-beforehand training is an edge analysis, a color analysis or a feature analysis.

8. A device of claim 7, wherein the method of beforehand training is a neural network or a template comparison.

9. A device of claim 6, wherein the face angle is defined by the training database by using a face feature, and the face feature is a facial attribute.

10. A device of claim 9, wherein when the face angle is within a range of 0 to 15 degrees, the shown face is defined as the front face; and when the face angle exceeds in 15 degrees, the shown face is defined as the non-front face.

* * * * *